United States Patent [19]

Hagge et al.

[11] Patent Number: 4,699,558
[45] Date of Patent: Oct. 13, 1987

[54] MOBILE CARGO LOADER FOR LIFTING AND TRANSPORTING BUILDING MODULES AND THE LIKE

[75] Inventors: Douglas R. Hagge, Columbus; Clifford V. Johnston, Hebron, both of Ohio

[73] Assignee: Cardinal Industries, Inc., Columbus, Ohio

[21] Appl. No.: 822,533

[22] Filed: Jan. 27, 1986

[51] Int. Cl.$^4$ ................................................ B60P 1/00
[52] U.S. Cl. ................................. 414/458; 280/43.23; 414/474; 414/495; 414/10; 414/483; 254/2 R
[58] Field of Search ............... 414/474, 481, 458, 459, 414/460, 461, 495, 498, 607, 608, 12, 10, 785, 483; 254/2 R, 2 B, 2 C; 280/43.23, 43.17, 43, 43.15, 43.16

[56] References Cited

U.S. PATENT DOCUMENTS

| 2,512,333 | 6/1950 | Jaffa et al. | 414/459 |
|---|---|---|---|
| 3,018,905 | 1/1962 | Thornton-Trump | 414/458 |
| 3,529,736 | 9/1970 | Lebre | 414/458 |
| 3,861,535 | 1/1975 | Huxley, III et al. | 414/460 X |
| 3,972,308 | 8/1976 | Ray | 414/495 X |
| 4,232,879 | 11/1980 | Boxrud | 280/43.23 X |
| 4,392,662 | 7/1983 | Hoglinger | 280/43.23 |

FOREIGN PATENT DOCUMENTS

| 2030524 | 12/1971 | Fed. Rep. of Germany | 280/43.23 |
|---|---|---|---|
| 2046238 | 3/1972 | Fed. Rep. of Germany | 280/43.23 |
| 1545843 | 10/1968 | France | 414/458 |
| 645890 | 2/1979 | U.S.S.R. | 414/458 |

Primary Examiner—Frank E. Werner
Attorney, Agent, or Firm—Wm. Cates Rambo; William S. Rambo

[57] ABSTRACT

A generally U-shaped frame is formed with a pair of elongated beams, each having a pair of pivotally mounted load-engaging dogs, and with a pair of elongated sleeves, each extending upwardly from the free end of one of the beams. An elongated post is slidably and telescopically mounted in each of the sleeve. Each post is mounted on a wheel-supporting carriage. A hydraulic jack is mounted in each of the telescoping post and sleeve assemblies to raise and lower the frame relative to the base assemblies. Hydraulic motors and lines are provided so that the dogs can be pivoted and the frame raised and lowered by the operator of a fork lift which is attached to a hitch extending from the closed end of the frame.

2 Claims, 9 Drawing Figures

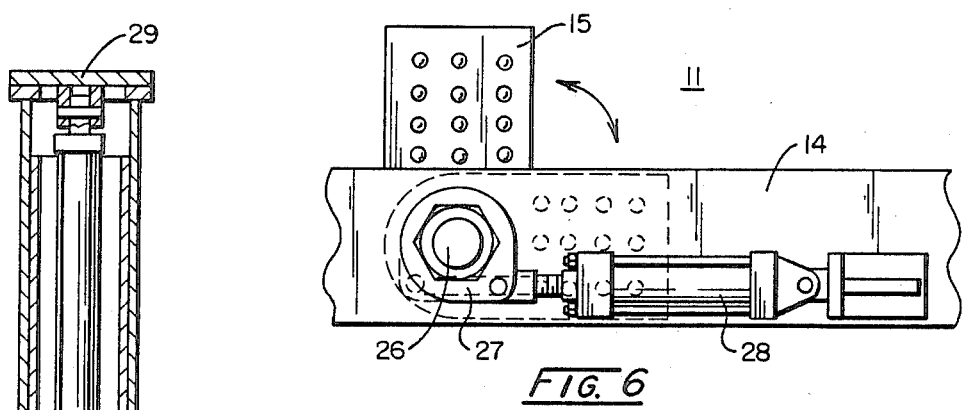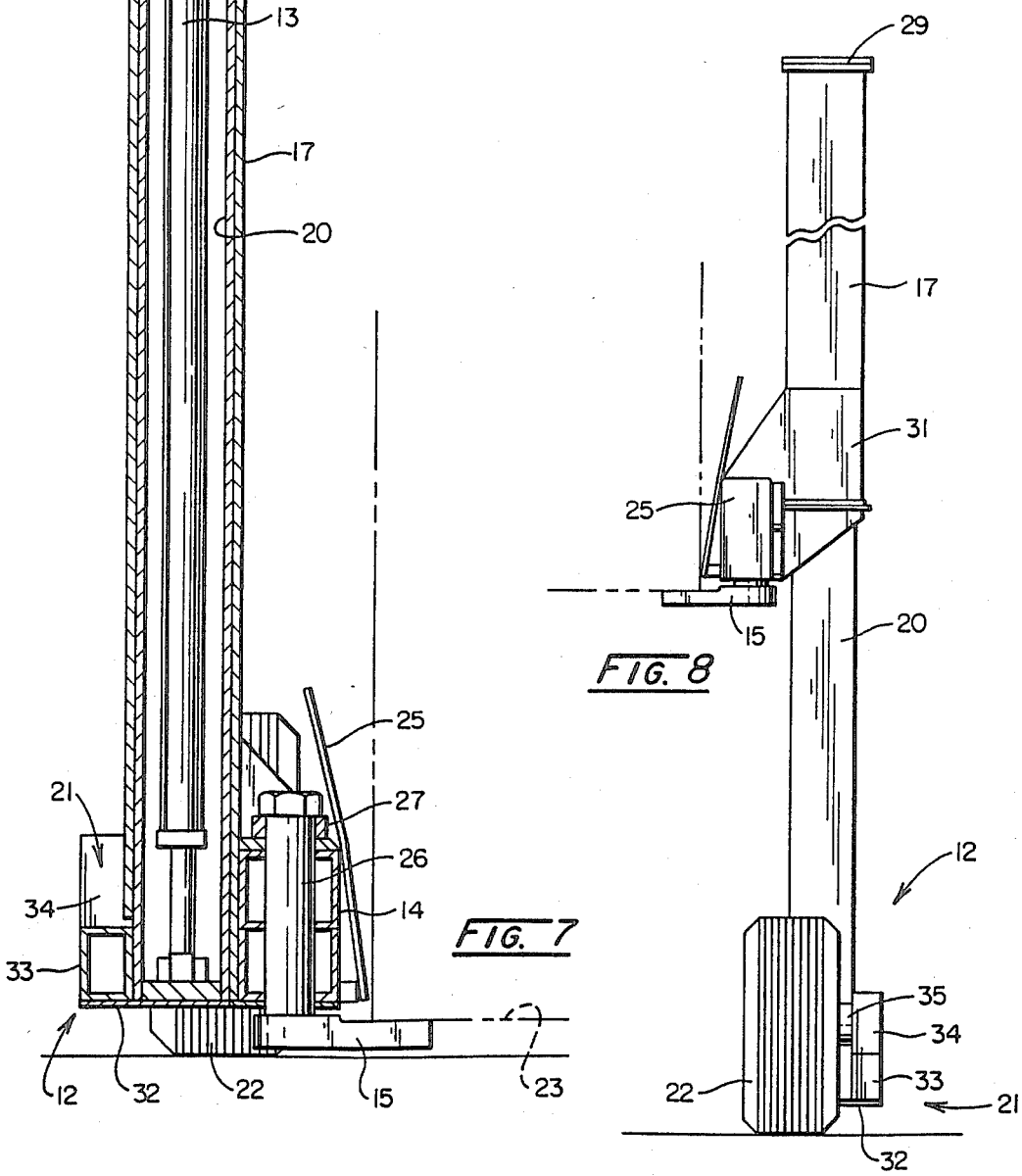

MOBILE CARGO LOADER FOR LIFTING AND TRANSPORTING BUILDING MODULES AND THE LIKE

TECHNICAL FIELD

The present invention relates to mobile, hydraulically actuated cargo lifting and transferring apparatus, and more particularly to loaders and shuttles that are powered and controlled with an auxiliary vehicle and that are designed to lift building modules and the like off of a generally ground level position and move them to another location.

BACKGROUND ART

The closest prior art known to the inventors is illustrated in FIGS. 1 and 2. The cargo shuttle or yard trailer illustrated therein, like the present invention, was designed to transport prefabricated building modules from the end of an assembly line to a highway semi-trailer or temporary storage cradle located in a storage or shipping area some distance from the end of the assembly line. Each module is roughly twenty-four feet long, twelve feet wide and twelve feet high at its taller end and weighs approximately five tons. The old yard trailer comprised a generally U-shaped, wheeled frame A that could be pivotally attached to a fork lift at the closed end thereof. Two relatively spaced apart vertical columns B were provided on each of side of the frame. As indicated in FIG. 2, each of the vertical columns was formed with a longitudinally coextensive channel C that opened toward an aligned column on the opposite side of the trailer. A block D was slidably mounted in each of the channels and a load-bearing foot member E was pivotally attached to each of the blocks. The sliding channel blocks and attached feet could be raised and lowered by means of hydraulically-actuated chain and pulley assemblies F mounted on each side of the frame. The operator could position the trailer, via the forklift, so that the sides of the frame were disposed along opposite sides of a module at the end of the assembly line and the feet were in their lowest possible positions in the channels. Upon activating the hydraulic units that controlled the chains, channel blocks and feet, the operator could lift the module off of the assembly line and carry it to a shipping or storage area located elsewhere on the plant grounds, whereupon it would be lowered onto a highway semitrailer or a temporary cradle.

There were a number of problems with the old yard trailer. First, the channel block in each of the columns was subject to a great deal of wear. Secondly, the old equipment could not raise the modules high enough to clear the ends of a newly designed semitrailer. In addition, it became difficult to position the feet close enough to the ground to fit underneath the base of the module after a new, lower profile roller or trolley was provided to carry the modules along the assembly line. Finally, and perhaps most importantly, the modules were being damaged by the old loader. Little space was provided between the vertical columns of the loader and the sides of the module so that the load-bearing feet could be as short as possible. After a period of use, the columns tended to become slightly inwardly angled under the force of the load, thereby eliminating what little space was provided originally for the modules. Consequently, the sides of the module would scrape against the stationary vertical columns as the module was raised and lowered.

While the present loader retained the generally U-shaped design of the old loader's frame, as well as the ability to be powered, directed and controlled, via mechanical, electrical and hydraulic connections, with a forklift or other auxiliary vehicle, the means by which the modules are raised and lowered is substantially different, as indicated below. As a result, the aforementioned problems of the prior art have been eliminated or reduced substantially.

DISCLOSURE OF THE INVENTION

The present mobile cargo loader basically comprises a generally U-shaped load-bearing frame, a pair of ground-engaging base assemblies, and a pair of fluid pressure responsive devices, each extending from one of the base assemblies to the frame for adjusting the height of the frame relative to the base assemblies. The frame includes a pair of relatively spaced apart elongated beams, cargo engaging mechanisms carried on the beams, a pair of elongated sleeves, each carried on one of the beams in angular relation thereto, and a device for attaching the frame to a source of propulsion. Each of the base assemblies includes an elongated post extending telescopically into one of the sleeves of the frame, a carriage portion connected to and supporting the post, and a ground wheel rotatably mounted on the carriage portion.

Preferably, the fluid pressure responsive devices are elongated hydraulic jacks carried within the posts of the base assemblies and sleeves of the frame. In addition, the cargo-engaging mechanisms preferably include a pair of hydraulically actuated dogs pivotally mounted on each of the frame beams.

A primary object of the present cargo loader is to provide a frame that is raised and lowered with the cargo, thereby preventing damage to said cargo. Another object of the present loader is to provide a greater range in cargo height adjustment than heretofore possible. Yet another object is to provide a more durable cargo loader than heretofore possible. Other objects and advantages may be more readily perceived in view of the following drawings and written specification.

BRIEF DESCRIPTION OF THE DRAWINGS

FIG. 6 is an enlarged, fragmentary top plan view of one of the beams of the present loader and particularly illustrates the preferred cargo-engaging dogs pivotally mounted thereon;

FIG. 7 is a vertical sectional view taken along lines 7—7 of FIG. 5 and particularly illustrates the preferred manner in which the post, telescoping sleeve, and cargo-engaging dogs are constructed;

FIG. 8 is a front elevational view, partially broken away, of one of the sleeves in a raised position relative to the post extending therein.

BEST MODE FOR CARRYING OUT THE INVENTION

Figure 1:
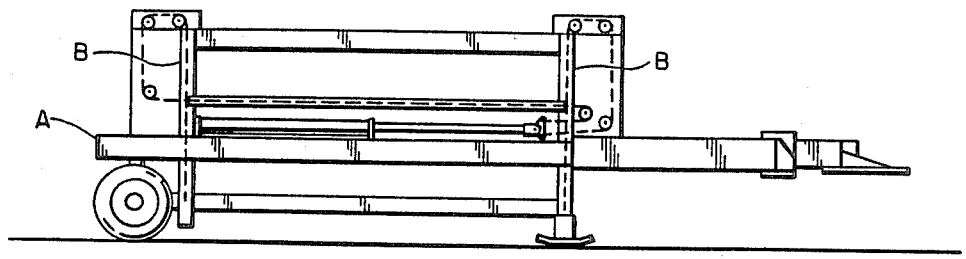
FIG. 1 is a side elevational view of an earlier, prior art cargo loader.
Figure 2:
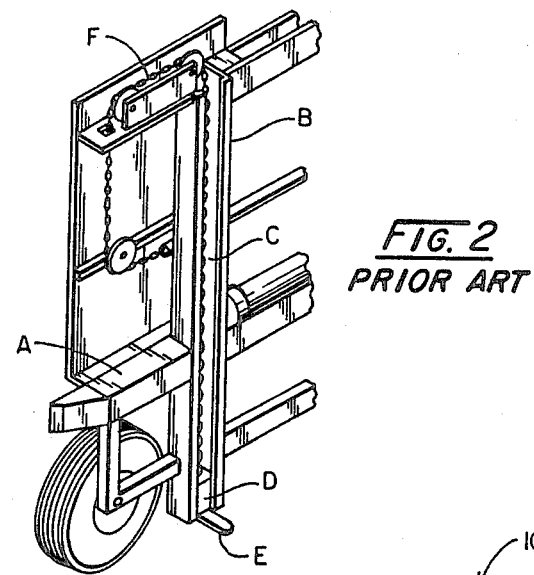
FIG. 2 is an enlarged fragmentary perspective view of one of the open ends of the prior art loader illustrated in FIG. 1.
Figure 3:
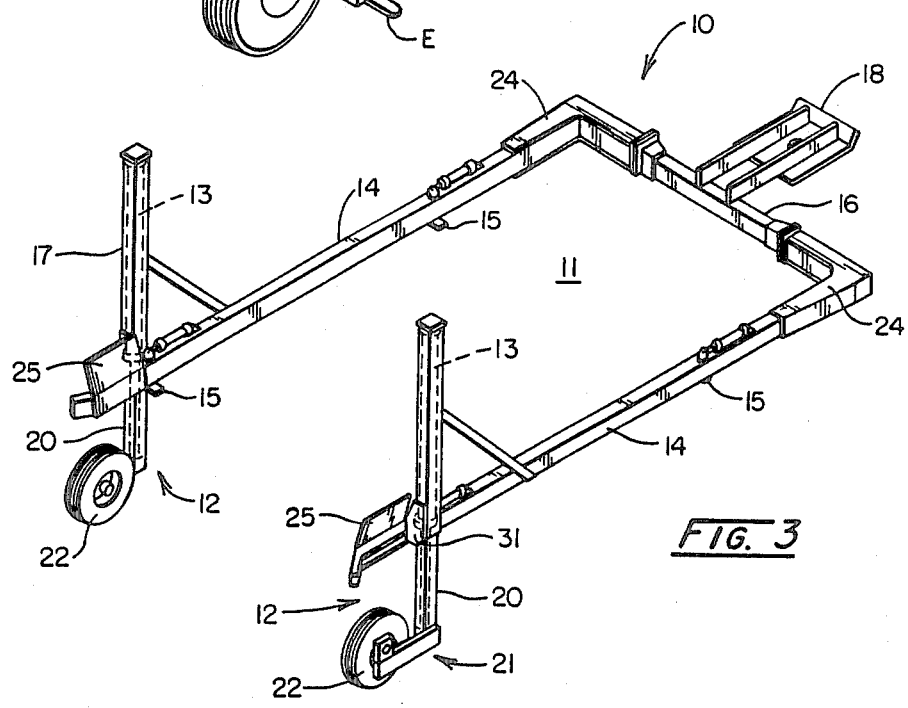
FIG. 3 is a relatively reduced perspective view of a mobile cargo loader according to the present invention in which the fluid-pressure responsive devices are shown in phantom outline within the sleeves and posts, and in which the frame is partially elevated from the base assemblies.
Figure 9:
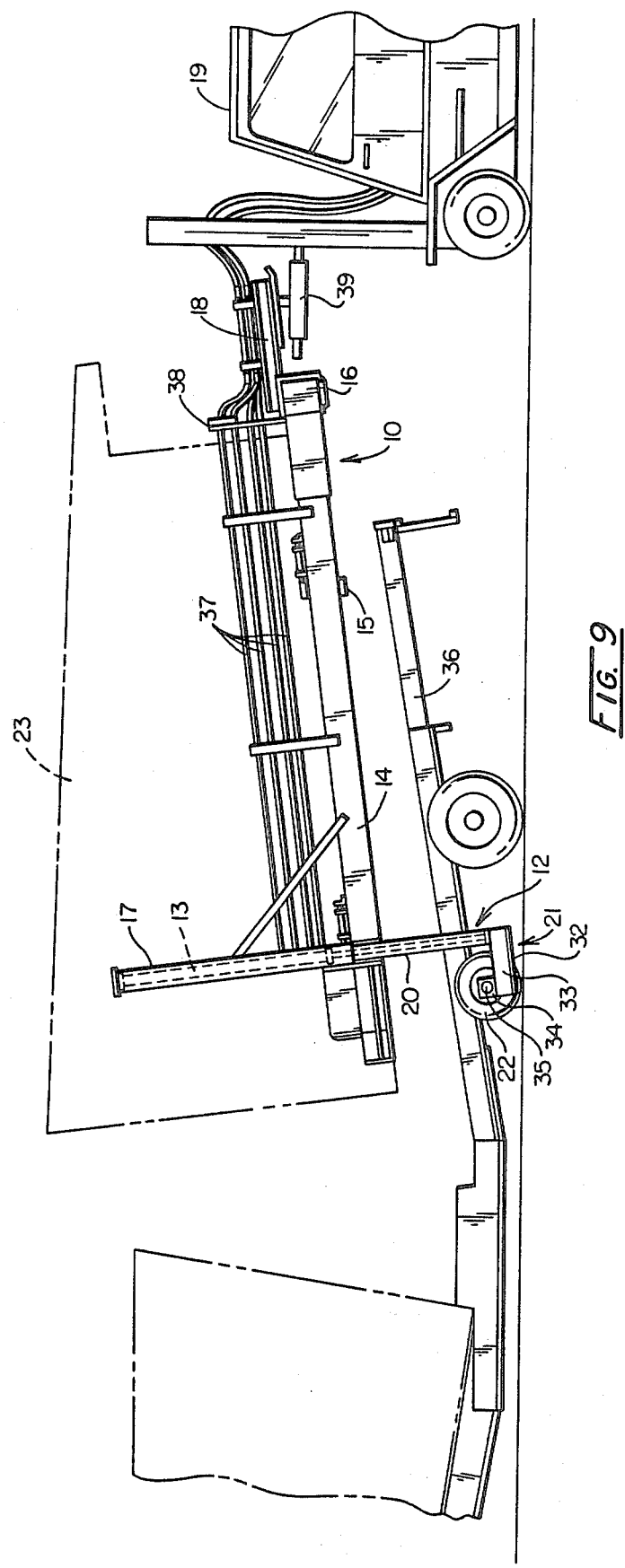
FIG. 9 is a side elevational view of the present loader with the frame in an elevated position and particularly illustrates the preferred manner in which a building module is maneuvered onto a highway semitrailer.

As indicated in FIG. 3, a mobile cargo loader according to the present invention basically comprises a generally U-shaped load-bearing frame, generally designated 10, that defines an open, cargo-receiving space 11, a pair of base assemblies generally designated 12, and fluid pressure responsive devices 13 extending from each of the base assemblies to the frame for adjusting the height of the frame relative to the base assemblies. The frame 10 includes a pair of relatively spaced apart elongated beams 14, cargo-engaging devices 15 carried on the beams, a cross member 16 connected to the beams to form a closed end of the frame, a pair of elongated sleeves 17 each carried on one of the beams in angular relation thereto, and a device 18 for attaching the frame to a source of propulsion 19 (FIG. 9). Each of the base assemblies 12 includes an elongated post 20 extending telescopically into one of the sleeves 17, a carriage portion, generally designated 21, connected to and supporting the post, and a ground wheel 22 rotatably mounted on the carriage portion.

The cargo which the present loader or transporter was designed to carry comprises prefabricated building modules 23 (FIGS. 5 and 9) that weigh approximately five tons each and that are usually equipped with plumbing fixtures, kitchen appliances, finished interior walls and the like. These building modules 23 can be damaged extensively if subjected to various bending or twisting forces, so it is important to construct the present cargo loader sturdily to prevent such forces from reaching the module.

Accordingly, the beams 14, cross member 16 and sleeves 17, as well as the posts 20 and portions of the carriages 21, are preferably formed from box-like tubular steel members generally rectangular in cross sectional configuration. These members are sufficient in size and thickness to withstand the torsional and bending forces that arise when the present loader is shuttling the modules across uneven driveways and storage areas. In addition, the cross member 16 may be provided with enlarged corner portions 24, defined by upper and lower L-shaped plates, to provide additional reinforcement and support for the beams 14 and cross member 16.

Additional strength is preferably obtained as follows. The device 18 for attaching the frame 10 to a source of propulsion 19 is a socket-bearing hitch member that extends outwardly from and is rigidly secured to the cross member 16. Alternatively, the source of propulsion 19 may be built into the present loader, rather than being supplied by an auxiliary vehicle such as the forklift 19 illustrated in FIG. 9. In any event, the hitch assembly 18 may include a number of reinforcing flanges, webs and plates disposed in a manner well known in the art to strengthen the hinge and its connection to the cross member 16. In addition, all of the connections between the beams 14, cross member 16, sleeves 17 and hitch assembly 18 may be welded. Likewise, the posts 20 may be welded to the carriage portions 21. The cross member 16, however, may be provided advantageously with a removable central section that is bolted into place. In this manner, the frame may be divided in half to ease shipment.

While the elongated frame beams 14 are, for the most part, of hollow box-like construction, the frame 10 is preferably provided with a set of guard plates 25 projecting generally forwardly and outwardly from the free ends of each of the beams 14. The guard plates 25 create a funnel-like module-receiving opening, thereby protecting the cargo from the wheels 22 and corners of the frame as the loader is advanced into a cargo-carrying position, and as the frame is lifted to engage the building module.

Figure 5:
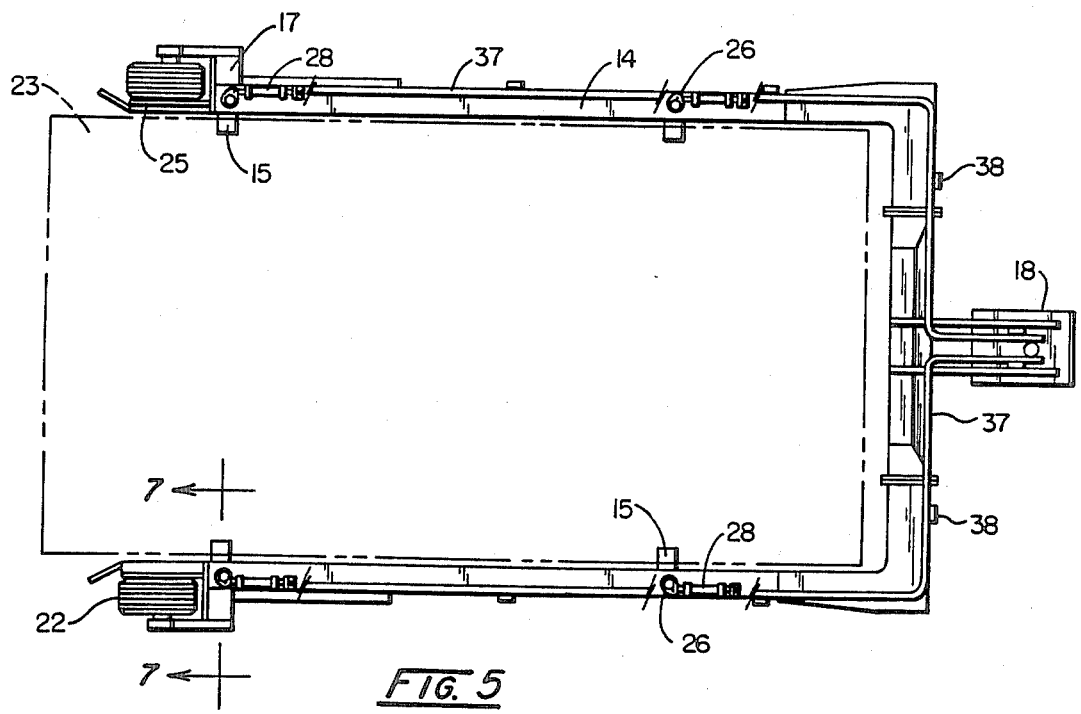
FIG. 5 is a top plan view of the cargo loader shown in FIG. 2 and particularly illustrates the preferred manner in which the cargo is positioned theron.

As best indicated in FIGS. 5-7, the cargo-engaging devices 15 preferably consist of the following components. Disposed below the lower wall of each of the beams 14 are a pair of relatively spaced apart, pivotal lifting bars or dogs 15. Each dog 15 is a relatively thick, steel plate-like structure provided on the upper surface thereof with a plurality of weld beads. These protruberances assist in gripping the base of the building module 23 and thereby resist shifting movement of the cargo as it is being transported. Each of the dogs 15 is pivotally or rotatively carried on one of the beams 14 by means of a cylindrical post 26 that extends through said beam and that is rigidly secured to a base portion of the dog. The upper end of the post 26 projects above the upper surface of the beam 14 and is provided with a crank plate 27 that has an eccentric portion to which the piston of a hydraulic motor 28 is attached. By activating the hydraulic motor 28, the operator of the forklift 19 is able to pivot the dogs 15 between retracted positions generally aligned with the beams 14 and extended positions wherein the dogs project generally perpendicularly from said beams into the cargo-receiving space 11.

Figure 4:
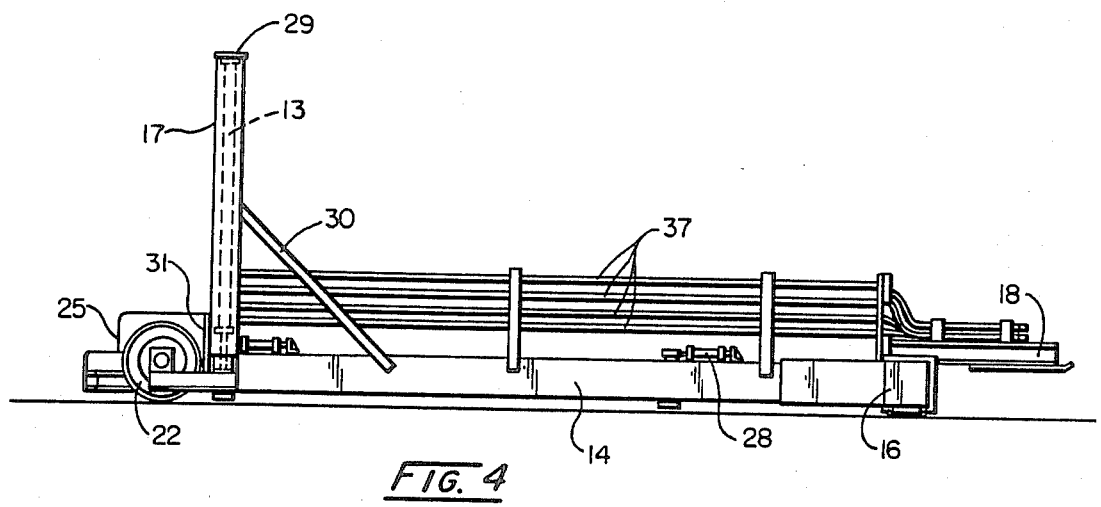
FIG. 4 is a side elevational view of a cargo loader according to the present invention and particularly illustrates the proximity of the cargo-engaging, pivotal dogs to the ground when the frame is in its lowest position.

As indicated in FIGS. 4, 7 and 8, the sleeves 17 are preferably constructed in the following manner. A reinforced steel plate or cap 29 is welded or otherwise rigidly secured to the top of each sleeve and serves as a mount and an endstop for one end of the hydraulic jack 13 depending therefrom. The sleeves 17 project upwardly from the free ends of their respective beams 14 and are welded to the lateral outer surfaces of said beams in generally perpendicular relation thereto. Additional reinforcement for the sleeve to beam connection is provided by a diagonally disposed, reinforcing strut 30 that is welded to each of the sleeves 17 and adjoining frame beams 14. Diagonally projecting bracket plates 31 are welded to adjacent front surfaces of the beams 14 and sleeves 17 and to adjoining portions of the guard plates 25. Alternatively, the struts 30 and bracket plates 31 could be dispensed with, and the sleeves 17 could be rotatively or pivotally mounted on the beams 14, provided that such junctions were strong enough to convey the lifting forces exerted on the sleeves by the jacks 13 to the beams 14, and further provided that the guard plates 25 were adequately supported in some other manner.

As indicated in FIGS. 7-9, each of the ground-engaging base assemblies 12 is preferably constructed as follows. The post 20, like the sleeve 17 within which it is slidably and telescopically mounted, is an elongated, box-like column. Since the post 20 and sleeve 17 have noncircular cross-sectional configurations, said sleeve, being secured to one of the beams 14, prevents said post from rotating about its longitudinal axis. Alternatively, the sleeve 17 and post 20 could be cylindrical and provided with cooperative spline and groove members. In either case, the wheels 22 are prevented from toeing inwardly or outwardly so that the direction of travel of the loader can be controlled. The post 20 is mounted on a carriage assembly 21 which includes a platform 32, a laterally offset, forwardly projecting wheel-supporting arm 33 and a non-rotative axle block 34. Said carriage members are disposed predominantly below the wheel axle 35 so that the cargo-engaging dogs 15 can be positioned as close to the ground as possible. For the same reason, the bottom edge of the sleeve 17 is substantially higher on the lateral outer surface thereof than on the inner, beam-adjoining surface. In this manner, the support arm 33 of the carriage does not interfere with the downward movement of the sleeve 17. In order for the base assembly 12 to be mobile, however, the axle block 34 projects upwardly from the forward end of the support arm 33 and houses the axle 35 of the wheel 22. Preferably, the axle 35 is fixed relative to the axle block 34 and is rotatably mounted in the wheel 22.

It is advantageous to employ relatively elongated sleeves 17 and posts 20 for several reasons. First, in order for the present loader to lift the building module 23 (FIG. 9) sufficiently to clear one end of a semitrailer 36 on which said module is being loaded, the fluid pressure responsive devices 13 extending from the base assemblies 12 to the frame 10 must be quite long. Since these lifting devices 13 are preferably elongated hydraulic jacks disposed within the telescoping sleeves 17 and posts 20, said sleeves and posts must be sufficiently long to accommodate said jacks. Furthermore, a substantial amount of overlap between the telescoping posts 20 and sleeves 17 is needed to keep the wheels 22 properly aligned with the frame beams 14 while the cargo-laden frame 10 is in an elevated position and the present transporter is being moved by the fork lift 19.

As indicated in FIGS. 4 and 5, a plurality of hydraulic fluid and electrical conduits 37 are mounted on the frame 10. As may be readily understood, pairs of hydraulic fluid lines extend from each of the hydraulic jacks 13 mounted in the telescoping posts 20 and sleeves 17, as well as from the dog-driving hydraulic motors 28, to the hitch 18. Suitable couplings, valve mechanisms, pumps, reservoirs and controls, well known in the art, are preferably disposed within the propelling vehicle 19 (FIG. 9), although it would be possible to equip the present loader with such devices, in the event that said loader were self propelled. In addition, at least one of the conduits 37 carries electrical wiring connected to limit switches (not shown) that open and close in response to the positions of the dogs 15, or the drive mechanisms connected thereto, and to indicator lights 38 that are mounted on opposite sides of the frame cross member 16 in order to be visible to the operator of the forklift 19. In this manner, the operator can know the position of the cargo-engaging dogs 15 without leaving the propelling vehicle before raising or lowering the frame 10.

The present cargo loader is operated in the following manner. As indicated in FIG. 9, a hitch plate 39 is mounted on the load-bearing forks of the lift 19. The operator maneuvers the forklift 19 so that the hitch plate 39 engages the hitch member 18 extending rearwardly from the frame cross member 16. Couplings are then made between the hydraulic and electrical lines 37 of the present loader and those provided on the forklift 19. Next, the operator raises the frame 10 off of the ground via the controls for the hydraulic jacks 13 and the controls for the forks of the lift 19. The loader is then maneuvered to the end of the assembly line and positioned so that the beam guards 25 are disposed adjacent to opposite corners of one end of the building module 23. The lift operator checks the position-indicating lights 38 to see that the dogs 15 are aligned with the beams 14 and lowers the frame 10 until said dogs and cross members 16 are barely off of the assembly line floor. The loader is then advanced until the beams 14 surround the opposing longitudinal sides of the module 23. The dogs 15 are pivoted inwardly, and the indicator lights 38 are checked to see that said dogs are properly positioned. The controls for the jacks 13 and forks of the lift 19 are then engaged to lift the module off of the assembly line.

The operator then backs the cargo-laden loader away from the assembly line and transports the module 23 to either a temporary cradle (not shown) or to a highway semitrailer 35, whereupon the frame 10 must be elevated sufficiently to clear the semitrailer. The loader is advanced so that the wheels 22 and base assemblies 12 are disposed on opposite sides of the semitrailer, and the building module 23 is centered over the load-carrying portion thereof. The controls for the jacks 13 and forks of the lift 19 are then manipulated to tilt the frame 10 so that the module 23 is inclined to conform to the inclined bed of the semitrailer 35. Since the dogs 15 are provided with protuberances, they are able to grip the undersurface of the module 23 and prevent it from sliding or shifting when one portion of the frame 10 is lower than another. The module 23 is then lowered onto the semitrailer 35. The frame 10 is then lowered further, the dogs 15 are pivoted into alignment with the beams 14, and the loader is backed away from the semitrailer.

Thus it can be seen that the present cargo loader is stable, relatively easy to maneuver and highly protective of the building modules it carries. All of the components of the loader that are disposed adjacent to the cargo move with said cargo when it is being elevated or lowered. This is particularly true of the sleeves which not only protect the modules and the hydraulic jacks contained therein, but also serve as the means by which the wheels and base assemblies are maintained in proper alignment with the frame as the loader is maneuvered between the assembly line and the shipping yard.

While a single preferred embodiment of the present invention has been illustrated and described in some detail, several modifications could be made without departing from the spirit of the invention or the scope of the following claims.

We claim:
1. A mobile cargo loader comprising:
  (a) a generally U-shaped load-bearing frame defining an open cargo-receiving space and including a pair of relatively spaced apart, generally horizontally disposed, elongated beams;
  (b) cargo-engaging means carried on each of the beams and movable into and out of said cargo-receiving space;
  (c) an upwardly projecting elongated guide sleeve of generally rectangular cross-sectional configuration rigidly connected with each of the beams in later- ally outwardly spaced relation to the cargo-receiving space;
(d) means for attaching the frame to a source of propulsion;
(e) an upwardly projecting, elongated, hollow post of rectangular cross-section telescopically and nonrotatably carried in each of the sleeves;
(f) carriage means connected to a lower end of each post and disposed outboard of said cargo-receiving space;
(g) a ground wheel rotatively mounted on the carriage means adjacent each post; and
(h) an elongated, fluid pressure responsive lifting device mounted within each of the relatively telescoping posts and sleeves for raising and lowering the sleeves and frame relative to the posts, carriage means and wheels.

2. A mobile cargo loader according to claim 1, wherein each of the elongated beams of the load-bearing frame is a box-like structure having upper, lower and side surfaces, wherein the cargo-engaging means comprise at least one dog pivotally mounted on the lower surface of each of the beams, and wherein at least one fluid pressure responsive actuator is disposed on the upper surface of each of the beams for rotating the dog between a relatively inturned position aligned with said beams and an extended position projecting into the cargo-receiving space.

* * * * *